(12) United States Patent
Park

(10) Patent No.: US 6,929,305 B2
(45) Date of Patent: Aug. 16, 2005

(54) STRUCTURE OF ASHTRAY FOR AUTOMOBILE

(75) Inventor: Seong-ryong Park, Seoul (KR)

(73) Assignee: Hyundai Mobis, Seoul (KR)

( * ) Notice: Subject to any disclaimer, the term of this patent is extended or adjusted under 35 U.S.C. 154(b) by 0 days.

(21) Appl. No.: 10/713,252

(22) Filed: Nov. 17, 2003

(65) Prior Publication Data

US 2005/0082863 A1 Apr. 21, 2005

(30) Foreign Application Priority Data

Oct. 17, 2003 (KR) .................. 10-2003-0072658

(51) Int. Cl.[7] ............................................ B60N 3/12
(52) U.S. Cl. ................. 296/37.9; 296/37.12; 312/246
(58) Field of Search ............... 296/37.9, 37.8, 296/37.11, 37.12; 248/311.2; 312/334.16, 312/334.7, 246, 332, 334.44, 334.8, 331, 312/330.1, 334.13; 384/42, 20, 23

(56) References Cited

U.S. PATENT DOCUMENTS

| | | | | |
|---|---|---|---|---|
| 2,793,092 A | * | 5/1957 | Peterson .................... | 296/37.9 |
| 2,944,865 A | * | 7/1960 | Hammesfahr ............. | 296/37.9 |
| 3,321,253 A | * | 5/1967 | Everburg ................. | 312/334.7 |
| 3,351,404 A | * | 11/1967 | Blake ......................... | 296/37.9 |
| 3,355,232 A | * | 11/1967 | Blake ......................... | 312/246 |
| 3,460,876 A | * | 8/1969 | Boer ........................... | 296/37.9 |
| 3,466,107 A | * | 9/1969 | Blake ......................... | 312/246 |
| 3,521,938 A | * | 7/1970 | Emaus ....................... | 296/37.9 |
| 3,586,394 A | * | 6/1971 | Hecksel ...................... | 312/246 |
| 3,600,051 A | * | 8/1971 | De Boer ..................... | 312/246 |
| 3,601,464 A | * | 8/1971 | Boer .......................... | 296/37.9 |
| 3,738,725 A | * | 6/1973 | Visser ........................ | 312/246 |
| 4,266,836 A | * | 5/1981 | Sato ........................... | 312/246 |
| 4,712,845 A | * | 12/1987 | Nicol ......................... | 296/37.9 |
| 5,018,800 A | * | 5/1991 | Cziptschirsch et al. .... | 296/37.9 |
| 5,228,611 A | * | 7/1993 | Yabuya ................... | 296/37.12 |
| 5,393,137 A | * | 2/1995 | Bivens et al. .............. | 296/37.9 |
| 5,829,851 A | * | 11/1998 | Bivens et al. ............... | 312/331 |
| 5,887,930 A | * | 3/1999 | Klein ........................ | 296/37.9 |
| 6,565,168 B1 | * | 5/2003 | Baliko ........................ | 312/331 |
| 6,619,772 B2 | * | 9/2003 | Dierbeck ............... | 312/334.13 |
| 6,634,839 B2 | * | 10/2003 | Ferrari et al. ............... | 409/235 |
| 6,669,258 B1 | * | 12/2003 | Kato .......................... | 296/37.9 |
| 6,702,241 B2 | * | 3/2004 | Harada .................... | 248/311.2 |
| 6,779,858 B2 | * | 8/2004 | Mizrahi ................... | 312/330.1 |
| 6,786,686 B1 | * | 9/2004 | Koike ........................ | 409/235 |

FOREIGN PATENT DOCUMENTS

JP 6-87368 3/1994

* cited by examiner

*Primary Examiner*—Kiran B. Patel
(74) *Attorney, Agent, or Firm*—Greenblum & Bernstein, P.L.C.

(57) ABSTRACT

The structure of an ashtray for automobiles in a slide-type fashion of a main body sliding into and out of a housing, in which there is no clearance between guide rails of the main body and the guide grooves of the housing during slide motion of the guide rails along the guide grooves, thus preventing movements of the main body when the main body is drawn into and out of the housing, and improving stability.

4 Claims, 3 Drawing Sheets

STRUCTURE OF ASHTRAY FOR AUTOMOBILE

RELATED APPLICATION

The present disclosure relates to subject matter contained in Korean application No.2003-72658, filed on Oct. 17, 2003, which is herein expressly incorporated by reference its entirety.

BACKGROUND OF THE INVENTION

1. Field of the Invention

The present invention relates to a structure of an ashtray for automobiles, and more particularly to a structure of an ashtray for automobiles in a slide-type fashion of a main body sliding into and out of a housing, in which there is no clearance between guide rails on the main body and guide grooves of the housing during the sliding motion of the guide rails along the guide grooves, thus preventing vertical and horizontal fluctuations of the main body when the body is drawn into and out of the housing, improving the comfort of use.

2. Description of the Related Art

Generally, an audio component and an air conditioning apparatus are installed at an upper portion of an instrument panel located in the front area within an automobile, and a collection box and ashtray are installed at a lower portion of the instrument panel.

Particularly, the ashtray installed for smoker's convenience generally has a slide-type structure. The ashtray having the slide-type structure is simple and hermetically sealed to some degree, thus reducing the spread of smell caused by cigarette butts.

As shown in FIG. 1, a conventional slide-type ashtray for automobiles comprises a housing 1 fixedly installed within an opening of the instrument panel, and a main body 20 accommodated by the housing 1 so that the main body 20 horizontally sides into and out of the housing 1 through an opening formed through a front surface of the housing 1.

In order to achieve the sliding motion of the main body 20 into and out of the housing 1, guide members 10 provided with guide grooves 12 are installed at both sides of the housing 1 in a longitudinal direction, and guide rails 22, which are inserted into the guide grooves 12 of the guide members 10, protrude from both sides of the main body 20.

Accordingly, when the main body 20 is pulled out of the housing 1 by an external force, the guide rails 22 of the main body 20 are slid forward along the guide grooves 12 of the guide members 10 of the housing 1 so that the main body 20 is drawn out of the housing 1. On the other hand, when the main body 20 is pushed into the housing 1 by an external force, the guide rails 22 of the main body 20 are slid backward along the guide grooves 12 of the guide members 10 of the housing 1 so that the main body 20 is drawn into the housing. Here, in order to smoothly slide the guide rails 22 of the main body 20 along the guide grooves 12 of the housing 1, the guide rails 22 must have a width smaller than that of the guide grooves 12.

In case the guide rails 22 have the same width as that of the guide grooves 12, the guide rails come into contact with the guide grooves 12, thereby increasing the frictional force between and being incapable of achieving a smooth slide motion along the guide grooves 12.

Accordingly, in the conventional slide-type ashtray for automobiles, there is generated a clearance having a designated distance between the guide rails 22 and the guide grooves 12. Thus, when the main body 20 is drawn into and out of the housing 1, the main body 20 is horizontally and vertically moved, thereby causing a problem of a low stability.

SUMMARY OF THE INVENTION

Therefore, the present invention has been made in view of the above problems, and it is an object of the present invention to provide a structure of an ashtray for automobiles in a slide-type fashion of a main body sliding into and out of a housing, in which there is no clearance between the guide rails of the main body and the guide grooves of the housing during a sliding motion of the guide rails along the guide grooves, thus preventing vertical and horizontal fluctuations of the main body when the main body is drawn into and out of the housing, and improving stability.

In accordance with the present invention, the above and other objects can be accomplished by the provision of a structure of an ashtray for automobiles in a slide-type fashion comprising: a housing fixedly installed within an opening of an instrument panel, and provided with guide grooves installed at both sides thereof in a longitudinal direction; a main body provided with guide rails, which are inserted into the guide grooves of the housing, formed on both sides thereof, and slid into and out of the housing; and protrusion means formed on the guide rails for allowing the guide rails of the main body to slide along the guide grooves of the housing while maintaining contact between the guide rails and the guide grooves.

Preferably, the protrusion means may include: a plurality of vertical protrusions formed on upper and lower portions of the guide rails or one of the upper lower portions of the guide rails; and a plurality of horizontal protrusions formed on external side surfaces of the guide rails.

In accordance with the above constitution of the ashtray, the guide rails of the main body firmly contact the guide grooves of the housing, thus generating no clearance therebetween and preventing vertical and horizontal fluctuations of the main body when the main body is drawn into and out of the housing.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
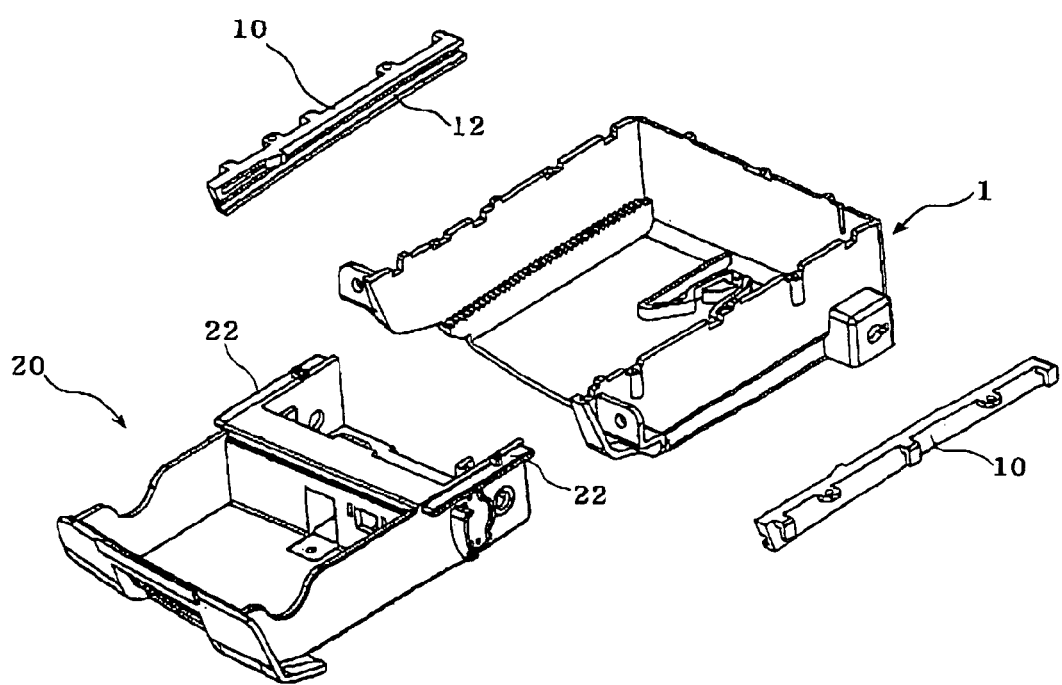
FIG. 1 is an exploded perspective view of a conventional ashtray for automobiles.
Figure 2:
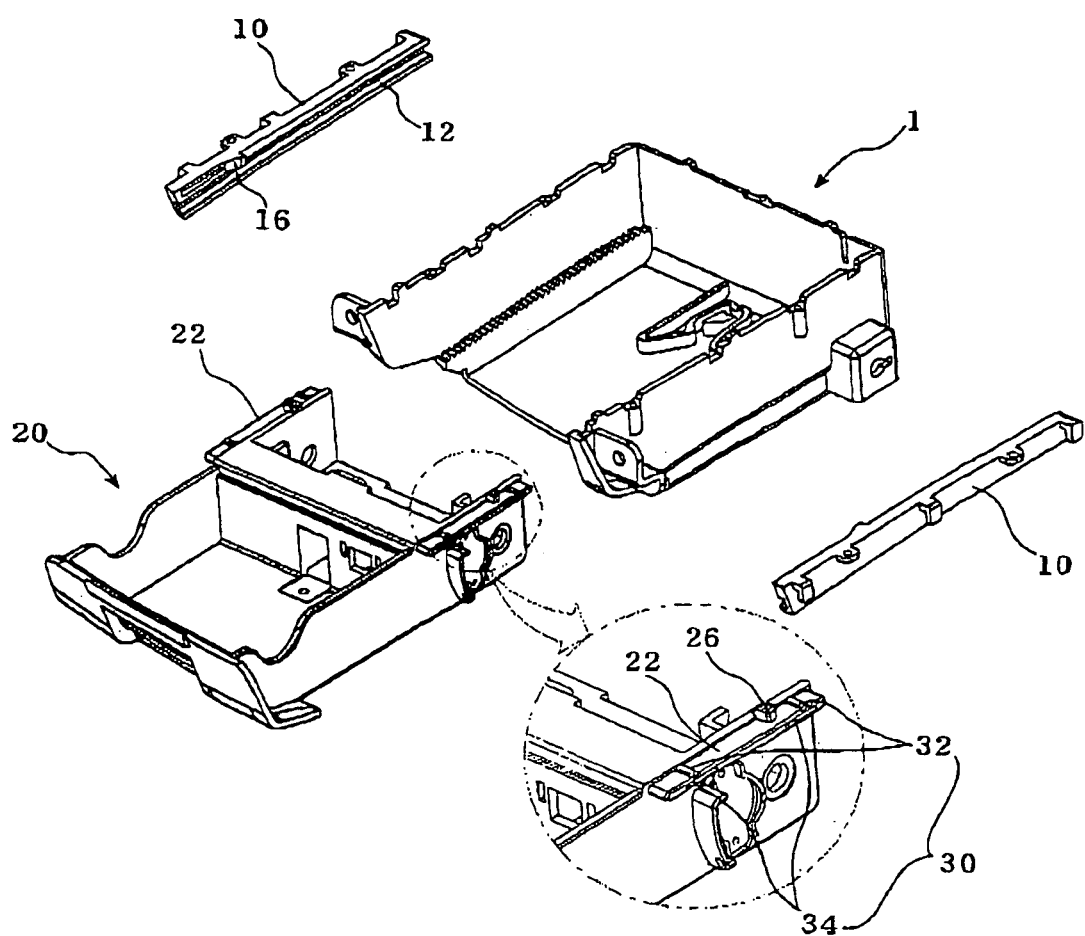
FIG. 2 is an exploded perspective view of an ashtray for automobiles in accordance with the present invention.
Figure 3:
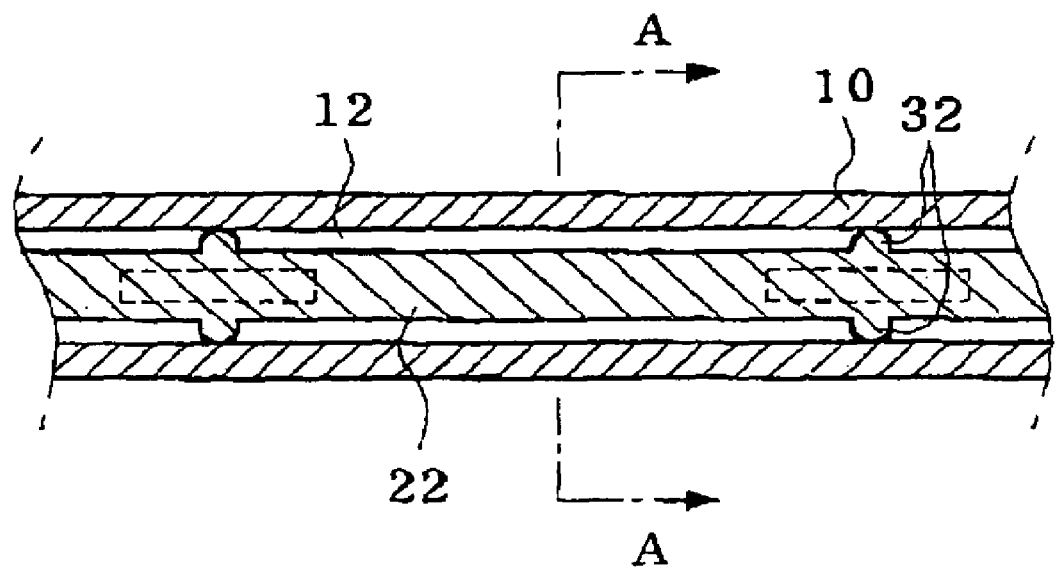
FIG. 3 is a cross-sectional view illustrating insertion of guide rails of a main body into guide grooves of a housing.
Figure 4:
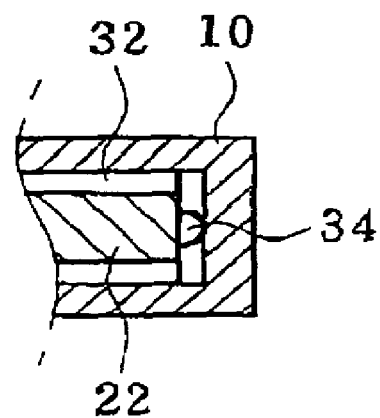
FIG. 4 is a cross-sectional view taken along the line A—A of FIG. 3.

In the following description of the present invention, elements, which are the same as or similar to those of the related prior art, are denoted by the same reference numerals, and a detailed description thereof will thus be omitted because it is considered to be unnecessary. FIG. 2 is an exploded perspective view of an ashtray for automobiles in accordance with the present invention. FIG. 3 is a cross-sectional view illustrating insertion of the guide rails of a main body into guide grooves of a housing. FIG. 4 is a cross-sectional view taken along the line A—A of FIG. 3.

As shown in FIG. 2, an ashtray for automobiles having a slide-type structure in accordance with the present invention comprises a housing 1 fixedly installed within an opening of an instrument panel, and a main body 20 accommodated by the housing 1 so that the main body 20 horizontally slides into and out of the housing 1 through an opening formed through the front surface of the housing 1. In order to achieve the sliding motion of the main body 20 into and out of the housing 1, guide grooves 12 are formed at both sides of the housing 1 in a longitudinal direction, and guide rails 22, which are inserted into the guide grooves 12 of the guide members 10, protrude from both sides of the main body 20.

In this embodiment of the present invention, guide members 10 provided with the guide grooves 12 are fixed to both sides of the housing 1. However, the guide grooves 12 may be integrally formed into both inner side surfaces of the housing 1 without the formation of the guide members 10. The ashtray for automobiles of the present invention further comprises protrusion means 30 serving to allow the guide rails 22 of the main body 20 to slide along the guide grooves 12 of the housing 1 while maintaining point contact between the guide rails 22 of the main body 20 and the guide grooves 12 of the housing 1.

The protrusion means 30 includes a plurality of vertical protrusions 32 formed on the upper and lower portions of the guide rails 22, and a plurality of horizontal protrusions 34 formed on external side surfaces of the guide rails 22. As shown in FIG. 3, the vertical protrusions 32 come into point contact with upper and lower protrusions of inner side surfaces of the guide grooves 12, thereby preventing the guide rails 22 from moving up and down within the guide grooves 12 during the sliding motion.

As shown in FIG. 4, the horizontal protrusions 34 come into point contact with internal portions of inner side surfaces of the guide grooves 12, thereby preventing the guide rails 22 from horizontally fluctuating within the guide grooves 12 during the sliding motion.

Accordingly, the degree of the vertical and horizontal protrusions 32 and 34 are determined in consideration of design values of the guide rails 22 and the guide grooves 12. Further, the number of vertical and horizontal protrusions 32 and 34 formed on the upper and lower portions and the external side surfaces of the guide rails 22 are suitably selected according to design conditions of the guide rails 22 and the guide grooves 12. It is preferable in terms of stability that the numbers of the vertical and horizontal protrusions 32 and 34 are plural rather than a single, which are spaced at a distance. In case the number of the vertical and horizontal protrusions 32 and 34 is excessive, friction force between the guide rails 22 and the guide grooves 12 during the sliding motion is increased. Thus, it is suitable that the number of both the vertical and horizontal protrusions 32 and 34 be two or three.

In this embodiment of the present invention, the plural vertical protrusions 32 are formed on the upper and lower portions of the guide rails 22. However, the vertical protrusions 32 may be formed on either the upper or lower portion of each of the guide rails 22.

In this case, one of the upper and lower portions of the guide rail 22, on which the vertical protrusion 32 are formed, comes in point contact with the inner side surface of the guide rail 12, and the other one of the upper and lower portions of the guide rail 22 comes in surface contact with the inner side surface of the guide rail 12. Accordingly, compared to the earlier case in which the plural vertical protrusions 32 are formed on the upper and lower portions of the guide rails 22, this case in which the vertical protrusions 32 are formed on either the upper or lower portion of each of the guide rails 22 causes friction between the guide rails 22 and the guide grooves 12 to increase, but still allows the guide rails 22 to slide along the guide grooves 12 moving up and down.

In the drawings, non-described reference numerals 16 and 26 represent a projection and a stopper, which prevent the main body 20 drawn out of the housing 1 from separating from the housing 1, respectively.

Hereinafter, function and effect of the ashtray for automobiles of the present invention will be described in detail.

As described above, the guide rails 22 of the main body 20 are inserted into the guide grooves 12 of the housing 1 so that the guide rails 22 come in point contact with the inner surfaces of the guide grooves 12 by the vertical and horizontal protrusions 32 and 34 formed on the guide rails 22 of the main body 20. That is, the guide rails 22 maintain point contact with the guide grooves 12 by means of the vertical and horizontal protrusions 32 and 34, thus minimizing friction between the guide rails 22 and the guide grooves 12 during the sliding motion and generating no clearance therebetween.

Accordingly, it is possible to smoothly draw the main body 20 into and out of the housing 1 without the generation of vertical and horizontal fluctuation.

Here, the vertical protrusions 32 formed on the upper and lower portions of the guide rails 22 serve to prevent the vertical movements of the guide rails 22 during the sliding motion along the guide grooves 12, and the horizontal protrusions 34 formed on the external sides of the guide rails 22 serve to prevent horizontal fluctuation of the guide rails 22 during the sliding motion along the guide grooves 12.

As apparent from the above description, the present invention provides an ashtray for automobiles, in which vertical and horizontal protrusions formed on guide rails of a main body maintain point contact with inner surfaces of guide grooves of a housing, thus generating no clearance between the guide rails and the guide grooves during slide motion of the guide rails along the guide grooves, preventing vertical and horizontal fluctuations of the main body when the main body is drawn into and out of the housing, and improving quality of sensibility.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure of a slidable ashtray for automobiles comprising:

a housing fixedly installed within an opening of an instrument panel, and provided with guide grooves installed at both sides thereof in a longitudinal direction;

a main body provided with guide rails, which are inserted into the guide grooves of the housing, formed on both sides thereof, and slidable into and out of the housing; and at least one generally rigid protrusion formed on each guide rail to allow the guide rails of the main body to slide along the guide grooves of the housing while maintaining point contact between the guide rails and the guide grooves.

2. The structure as set forth in claim 1, wherein the at least one protrusion includes:
   a plurality of vertical protrusions formed on upper and lower portions of the guide rails or one of the upper or lower portions of the guide rails; and
   a plurality of horizontal protrusions formed on the external side surfaces of the guide rails.

3. A structure of a slidable ashtray for automobiles comprising:
   a housing fixedly installed within an opening of an instrument panel, and provided with guide grooves installed at both sides thereof in a longitudinal direction;
   a main body provided with guide rails, which are inserted into the guide grooves of the housing, formed on both sides thereof, and slidable into and out of the housing; and at least one protrusion formed unitarily and in one piece on each guide rail to allow the guide rails of the main body to slide along the guide grooves of the housing while maintaining point contact between the guide rails and the guide grooves.

4. The structure as set forth in claim 3, wherein the at least one protrusion includes:
   a plurality of vertical protrusions formed on upper and lower portions of the guide rails or one of the upper or lower portions of the guide rails; and
   a plurality of horizontal protrusions formed on the external side surfaces of the guide rails.

* * * * *

UNITED STATES PATENT AND TRADEMARK OFFICE
CERTIFICATE OF CORRECTION

PATENT NO. : 6,929,305 B2
DATED : August 16, 2005
INVENTOR(S) : S. Park

It is certified that error appears in the above-identified patent and that said Letters Patent is hereby corrected as shown below:

<u>Title page,</u>
Item [56], References Cited, OTHER PUBLICATIONS, add the following reference:
-- English Language Abstract of JP 6-87368. --.

Signed and Sealed this

Twenty-eighth Day of March, 2006

JON W. DUDAS
*Director of the United States Patent and Trademark Office*